(No Model.)  
A. ANDERSON.  
CORN PLANTER.  
5 Sheets—Sheet 2.
No. 516,176. Patented Mar. 13, 1894.
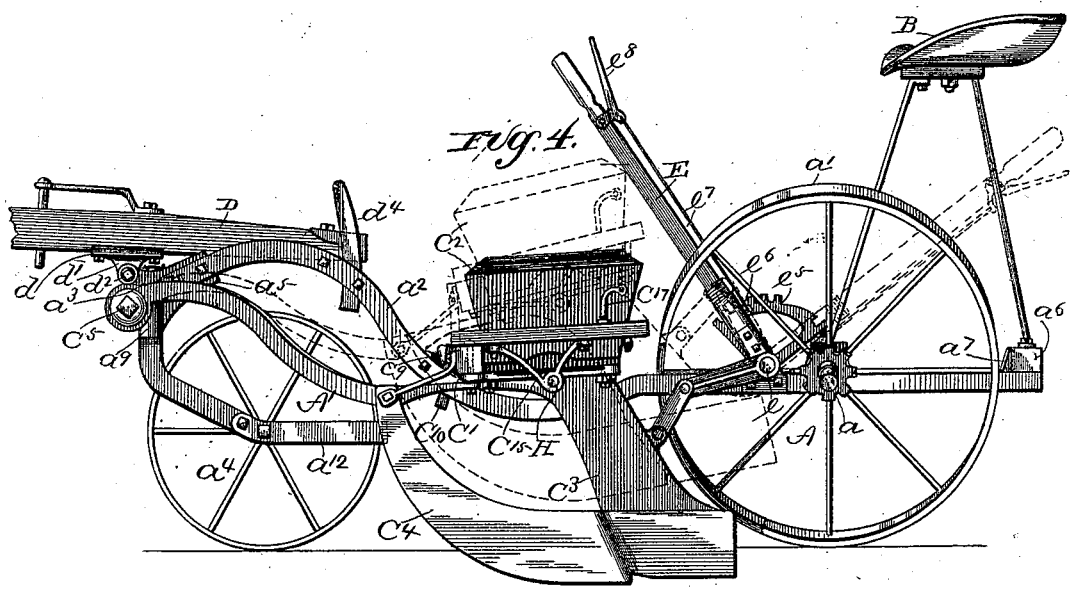
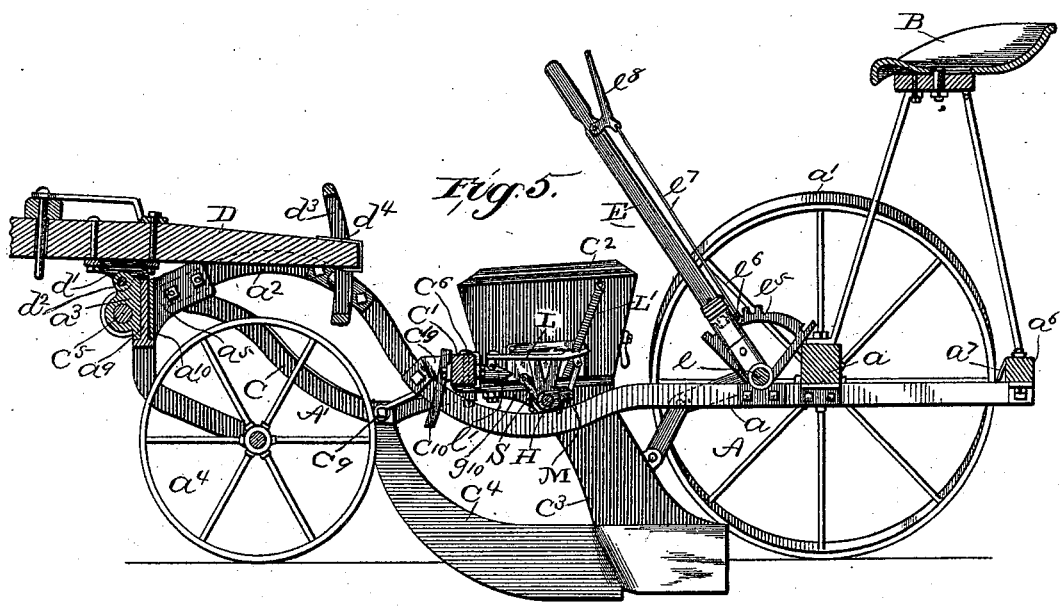

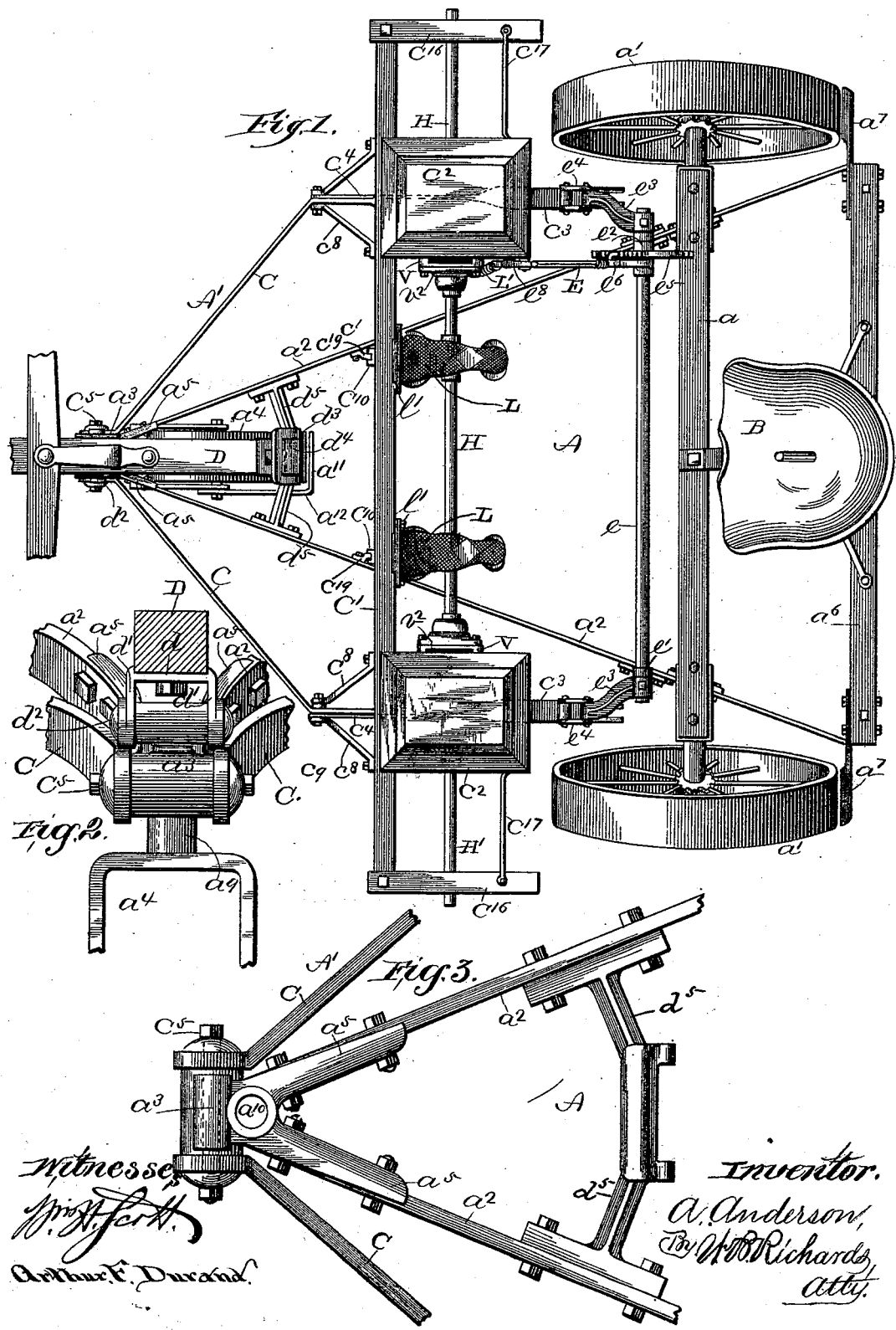

(No Model.) 5 Sheets—Sheet 3.
A. ANDERSON.
CORN PLANTER.
No. 516,176. Patented Mar. 13, 1894.
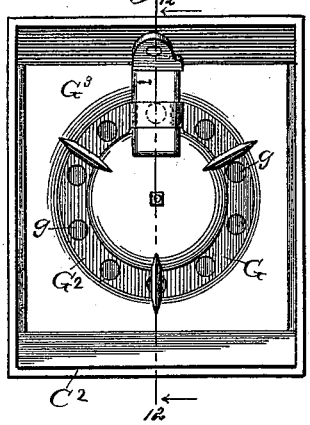
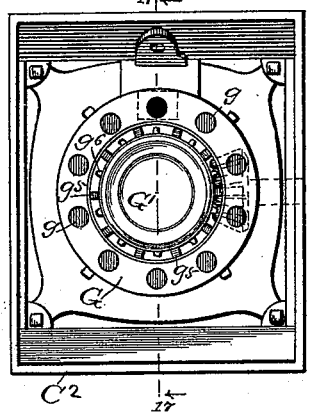
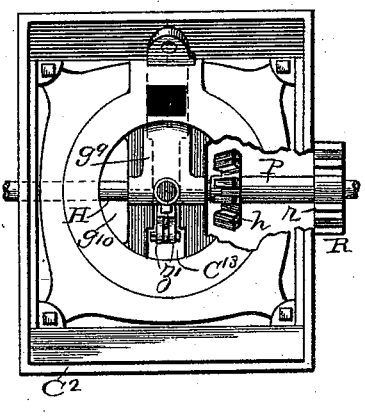
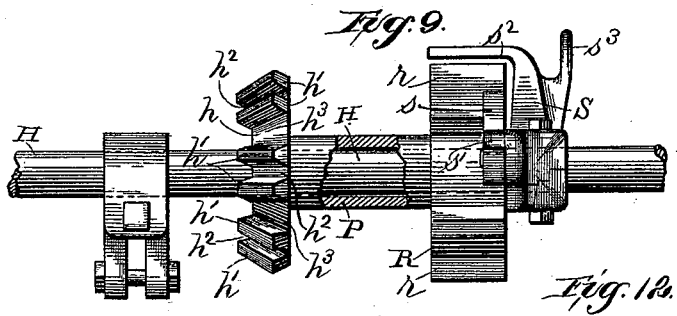
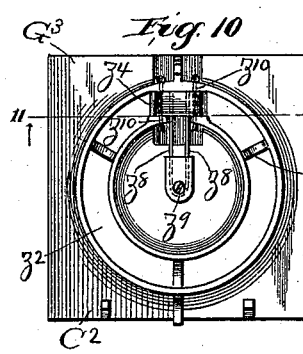
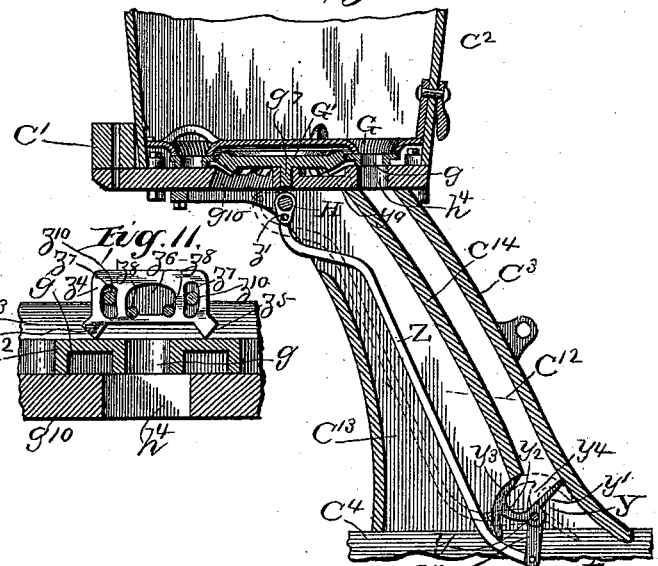
Witnesses:
Inventor:
A. Anderson,
By W. B. Richards,
Atty.
THE NATIONAL LITHOGRAPHING COMPANY,
WASHINGTON, D. C.

(No Model.) 5 Sheets—Sheet 4.
A. ANDERSON.
CORN PLANTER.
No. 516,176. Patented Mar. 13, 1894.
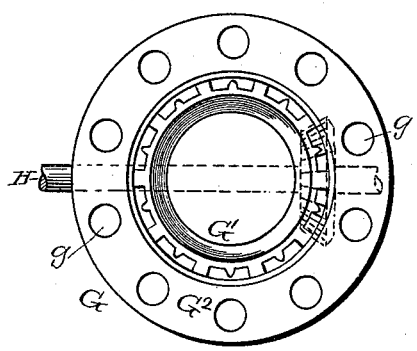
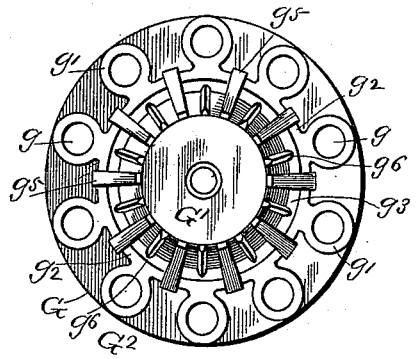
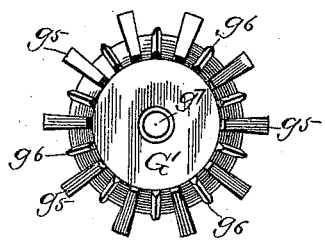
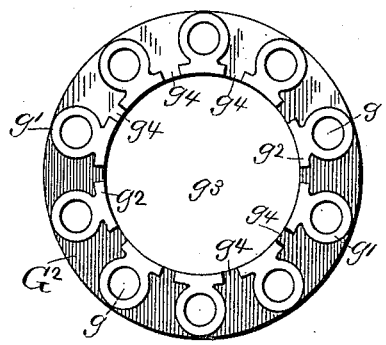
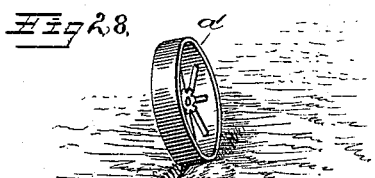
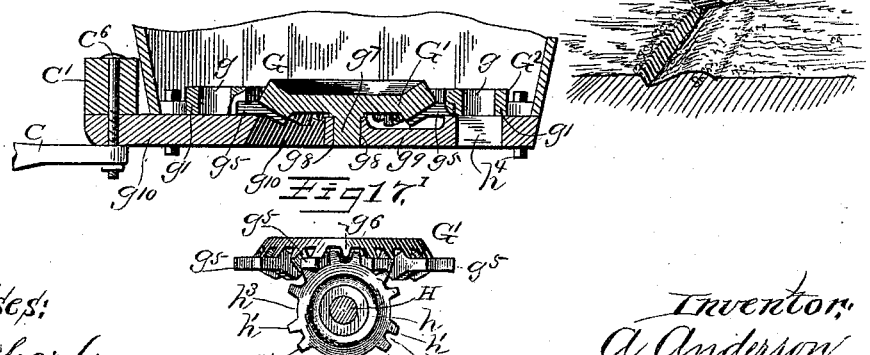
Witnesses:
H. M. Richards.
Inventor:
A. Anderson,
By W. W. Richards,
Atty.
THE NATIONAL LITHOGRAPHING COMPANY,
WASHINGTON, D. C.

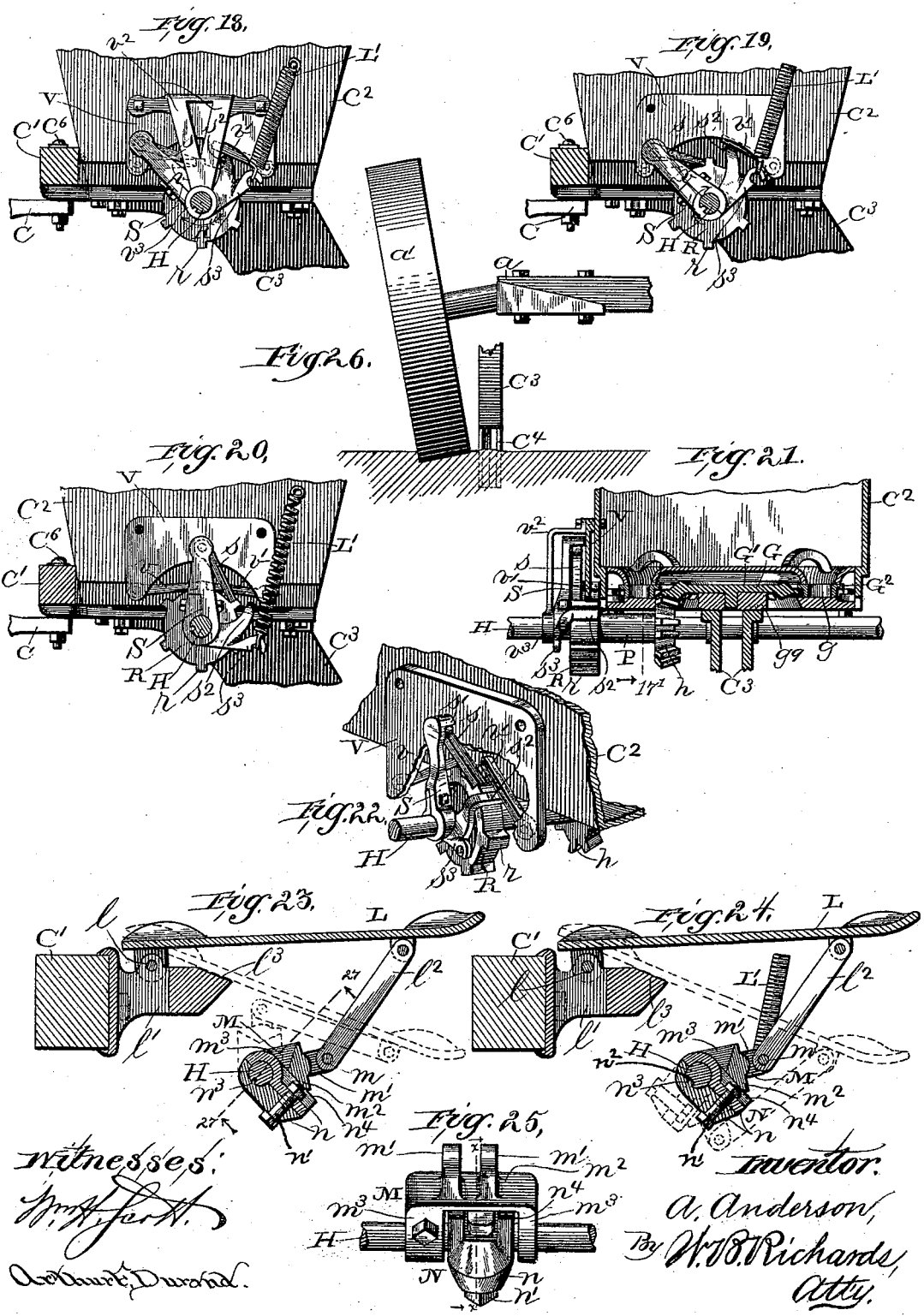

UNITED STATES PATENT OFFICE.

ABRAHAM ANDERSON, OF GALESBURG, ILLINOIS, ASSIGNOR TO THE G. D. COLTON & COMPANY, OF SAME PLACE.

CORN-PLANTER.

SPECIFICATION forming part of Letters Patent No. 516,176, dated March 13, 1894.

Application filed February 10, 1892. Serial No. 420,959. (No model.)

*To all whom it may concern:*

Be it known that I, ABRAHAM ANDERSON, a citizen of the United States, residing at Galesburg, in the county of Knox and State of Illinois, have invented certain new and useful Improvements in Corn-Planters, of which the following is a specification.

This invention relates to corn-planters, and my present improvements therein have for their object the production of an efficient machine for that purpose, and which while structurally strong and durable, will be efficient and simple in operation and economic of manufacture; and the invention consists in constructions, and combinations intended to accomplish these objects, and which are hereinafter described, and are made the subject matter of the claims hereto appended.

In the accompanying drawings all my improvements are shown as embodied in the best way now known to me; obviously, however, some of these improvements may be used without the others, and in planters differing in construction and organization from the planter shown by said drawings, in which—

Figure 1 is a top-plan of a corn-planter embodying my improvements, with the tongue and draft bars partly broken away; Fig. 2, a front elevation of detached parts of the hinge connection between the front and rear frames of the planter, and sectional elevation of the tongue; Fig. 3, a top plan of detached portions of the hinge connection shown at Fig. 2; Fig. 4, a side elevation of the planter, with the near wheel partly broken away to show parts beyond it; Fig. 5, a central sectional elevation of the planter, with foot pedal removed; Fig. 6, a top-plan of one of the seed-boxes, with its cover or lid removed; Fig. 7, a top plan of the seed-box shown at Fig. 6, with the cap plate also removed; Fig. 8, a top-plan of the seed-box shown at Fig. 7, with the seed-cup wheel also removed. This figure shows the rock-shaft in its position after operating the discharging valve at lower end of seed-tube; Fig. 9, a plan of a detached part of the rock-shaft for operating the seed-cup wheels, with other parts which are fixed thereto shown partly broken away; Fig. 10, a plan of the cap-plate which rests over the seed-cup wheel, and of the cut-off, in inverted positions; Fig. 11, a side elevation of the cut off, and sectional elevation of the seed-cup wheel, and bottom of the seed-box, in line 11, 11, in Fig. 10; Fig. 12, a sectional elevation of a seed-box, seed-cup wheel, cap, seed conducting tube and runner, in line 12, 12, in Fig. 6, cut-off not shown; Fig. 13, a top-plan of the seed-cup wheel, with its removable central part, or bevel pinion in place, and in gear with the drive pinion below it; Fig. 14, a plan of the seed-cup wheel and its removable central part, inverted; Fig. 15, a plan of the central part of the seed cup wheel, inverted; Fig. 16, a plan of the annular disk or outer part of the seed-cup wheel, inverted; Fig. 17, a sectional elevation of the seed-cup wheel, with its central part in place, and of the seed-box bottom, with its bearing bar $g^9$, in line 17, 17, in Fig. 7; Fig. 17', a side elevation of the central part of the seed-cup wheel, and the bevel pinion on rock-shaft in gear therewith, and section of rock shaft, in line 17', in Fig. 21; Fig. 18, a side elevation of the lower part of the seed-box, and parts of the mechanism for operating the seed-cup wheel, in their normal positions; Fig. 19, a side elevation of the same parts shown at Fig. 18 without the guards $v^2$; Fig. 20, a side elevation of same parts shown at Figs. 18 and 19, but in different relative positions from that shown at said figures; Fig. 21, an elevation of parts, and sectional elevation of other parts centrally and laterally of the seed-cup wheel; Fig. 22, a perspective of a detached part of the seed-box and of the mechanism for transmitting motion from the rock-shaft to the seed-cup wheel; Fig. 23, a sectional elevation of one of the foot pedals, the bar to which it is hinged, the rock-shaft it operates, and its hinge coupling therewith, in line $x$, $x$, in Fig. 25, showing the manner of disengaging it from the rock-shaft; Fig. 24, same sectional elevation as Fig. 23, but showing the manner of actuating the rock-shaft with the movements of the foot pedal; Fig. 25, a rear elevation of the coupling of the foot pedal to the rock-shaft; Fig. 26, Sheet 5, a rear elevation of one of the planter wheels, part of its axle, and parts of the seed-tube and runner in advance of said wheel; Fig. 27, Sheet 4, a sectional elevation in the line 27, 27, in Fig. 23; Fig. 28, Sheet 4, a perspective of one of the inclined wheels, showing its operation.

The different figures of the drawings are made to different scales, as is evident, and the same reference letter is used in each of said figures to designate the same part.

The frame work of this planter is in two different frames, or parts, a forward frame or part, and a rear frame or part, as is common. The rear frame A consists in its essential parts of an axle $a$, supported on wheels $a'$, side frame bars $a^2$, head or block $a^3$ supported on a caster wheel $a^4$. The side frame bars $a^2$, preferably of iron or steel, diverge toward their rear ends, near which they are bolted and fixed to the axle $a$, and converge toward their forward ends, which are bolted and fixed to wings $a^5$ that project from the head $a^3$. The bars $a^2$ extend in rear of the axle $a$, and carry at their rear ends a transverse bar $a^6$, on which are mounted the wheel-scrapers $a^7$. The standard $a^9$ of the caster wheel $a^4$ is journaled in a vertical bearing $a^{10}$ in the head $a^3$, and preferably carries a wheel-scraper $a^{11}$ on an arm $a^{12}$. The driver's seat B is mounted on the rear frame. The wheels $a'$ support the rear end part of the frame A, and the caster wheel $a^4$ supports its forward end part in all of the operations of the planter.

The forward frame or part A' consists in its essential parts of the side frame bars $c$, and transverse bar $c'$, to which are fixed seed-boxes $c^2$, seed-conducting tubes $c^3$ and runners $c^4$. The bars $c$, preferably of iron or steel, are pivotally connected at their forward ends by a horizontal bolt $c^5$ to the head $a^3$, and thence diverge toward their rear ends to points near the seed-boxes $c^2$, from which points they preferably extend parallel with each other, one to each seed-box bottom, to which it is fixed and bolted by the same bolt $c^6$ which fixes it to the bar $c'$, as shown at Fig. 5, and is preferably braced thereto by braces $c^8$. Each runner $c^4$ is fixed by a bolt $c^9$ to the bar $c$ above it, and at its rear end to the seed-tube, the upper end of which is bolted to the seed-box bottom, thus rigidly connecting with each other the bars $c$, seed-boxes $c^2$, seed-tubes $c^3$ and the runners $c^4$.

The front and rear frames are substantially triangular in form, the bars $c$ are exterior to the bars $a^2$, and are more divergent than the bars $a^2$, and the bar $c'$ is above the bars $a^2$. It will be evident that the bars $c$, $c'$, and the runners, seed-boxes and seed-tubes may be fixed to each other in various ways so that they will move together, when the forward frame or part A' is raised and lowered at its rear portion, or swung in a vertical plane on the pivot bolt $c^5$, at its forward end, as contemplated by my improvement, to raise and lower the runners, seed-boxes and seed-tubes together or simultaneously, while the rear frame A remains unmoved thereby and is supported on the wheels $a'$, $a^4$, as hereinbefore described. Lugs $c^{19}$ are fixed, one to each bar $a^2$, the rear end of each of which fits loosely in a groove in a curved block $c^{10}$ that is fixed to the bar $c'$. These lugs $c^{19}$ slide up and down in said grooves to permit of raising the rear end of the forward frame, while the sides of the grooves in the blocks $c^{10}$ resist any lateral movement of the rear part of the forward frame, and thereby prevent the seed-tubes and runners swaying laterally to produce curved or crooked rows of plants. The tongue D has a block $d$ with pendent ears $d'$ fixed thereto, and a bolt $d^2$ passes through holes in these ears and through the block $a^3$, to form a pivot on which the tongue can swing in a vertical plane, to permit of its forward end rising and lowering without effecting the front or rear frames or throwing extra weight on the necks of the draft animals, and to permit of the forward and rear ends of the rear frame, and the forward end of the front frame rising and falling, as is desirable in passing over ground with uneven surface, clods, and like obstructions. The rear end of the tongue projects beyond the pivot bolt $d^2$ into a slot $d^3$ in a block or plate $d^4$, which is supported by brackets $d^5$ that are fixed to the bars $a^2$ to permit of the vertical swing of the tongue, while bracing and staying it laterally, in turning the planter and otherwise swinging it sidewise by means of the tongue, and to prevent lateral movements of the planter at improper times. The brackets $d^5$ may, if preferred, project from the outer ends of the wings $a^5$. A shaft $e$ extends across the bars $a^2$ and is journaled in brackets $e'$, $e^2$, which are fixed to and project upwardly from the bars $a^2$. A crank arm $e^3$ is fixed to each end of the shaft $e$, and each crank $e^3$ is pivotally connected at its outer end with one end of a link rod $e^4$, which is pivotally connected at its other end with one of the seed-tubes $c^3$. The lever E is fixed at its lower end to the shaft $e$, so that it can be swung to raise and lower the rear part of the forward frame A'. The upper portion of the bracket $e^2$ is formed into or supports a curved rack bar $e^5$, with which a dog $e^6$ that is operated by an ordinary rod $e^7$ and thumb-lever $e^8$, can be engaged to lock the lever E to fix the height of the rear part of the frame A' after it is adjusted for planting at different depths, and to lock it to hold the frame A' with its runners $c^4$ entirely above the ground, as shown by dotted lines at Fig. 4, for turning the planter, and for other purposes.

The seed-cup wheel G is formed in two parts, a central part G' and an outer annular disk part $G^2$. The part $G^2$ has an ordinary circular series of seed-cups $g$ with annular flanges $g'$ at their lower sides. An annular flange $g^2$ also surrounds the central opening $g^3$ in the disk $G^2$, and has recesses $g^4$ therein, one on a radial line between each seed-cup and the one next to it. The part G' is a bevel pinion, with larger cogs $g^5$ arranged alternately with smaller cogs $g^6$. The larger cogs $g^5$ extend radially from the body part of the pinion G', (see Fig. 15,) and fit the recesses $g^4$ in the flange $g^2$, see Fig. 14, and hold the parts G', G², of the seed-cup wheel so that they revolve together, and in such manner that they can be easily and quickly put together in proper relative positions, and disks G² with different sized seed-cups be readily substituted when desired. Each seed-cup wheel revolves on a pendent pivot stud $g^7$ which projects centrally of and from the pinion G' and is journaled in a bearing G⁸ in a plate $g^9$ which projects inwardly from one side of the central opening $g^{10}$ in the seed-box bottom. The outer ends of the cogs $g^5$ rest and slide upon the wall of the opening $g^{10}$ in the seed-box bottom, and the annular flanges $g'$ rest and slide on said bottom and thus support and steady the seed-cup wheel in its revolutions.

A rock-shaft H extends across the forward frame of the planter, and is journaled in suitable bearings in the walls of the seed-tubes through which it passes.

Beneath one side of each seed-cup wheel a bevel pinion $h$ is mounted on the rock shaft H, as hereinafter described. The pinions $h$ each have cogs $h'$ in pairs, with narrower interdental spaces $h^2$ between the two cogs of each pair, and broader interdental spaces $h^3$ between the pairs of cogs $h'$. The smaller cogs $g^6$ of the bevel pinion G' are adapted to act in the counterpart narrow spaces $h^2$ between the two cogs $h'$ of each pair, and the larger cogs $g^5$ are adapted to act in the larger counterpart spaces $h^3$, as shown at Fig. 17'. When the seed-cup wheel is removed from the seed-box for any purpose, it can be easily, quickly and properly replaced relatively to the drive pinion $h$, to cause the seed-cups as they are revolved in their circular orbit to register or coincide successively with the opening $h^4$ in the seed-box bottom, as hereinafter described, by simply replacing it in such position that the cogs $g^5$, $g^6$, will engage with the counterpart spaces in the bevel pinion $h$, as hereinbefore described. The rock-shaft H is given a partial rotation or oscillatory motion in the direction shown by the arrow at Fig. 18, by means of the foot pedals L acted upon by the driver with his foot or feet, and a reverse motion by the spring L', as hereinafter described. The forward end of each foot pedal L is hinged at $l$ to a bracket $l'$ that is bolted to the bar $c'$ and the rear portion of each foot pedal is pivotally connected with one end of a link-rod $l^2$, the other end of which is pivotally connected at $m$ with ears $m'$ which project from a bar or tappet $m^2$ of a stirrup M. Arms $m^3$ also project from the tappet $m^2$, and are loosely journaled on the shaft H. An arm N made in two parts $n$, having confronting grooves which fit over the rock-shaft H, is fixed to the rock-shaft between the arms $m^3$ by a bolt $n'$ which fixes the parts $n$ to each other. To further secure the arm N against any movement circumferentially or lengthwise on the shaft H, one of the parts $n$ has a tongue or spline $n^3$ which is of curved form on its outer side and is seated by casting it in a correspondingly shaped groove $n^2$ in the shaft H, as shown best in Fig. 27. The arm N serves as a keeper to hold the stirrup M against movement lengthwise of the shaft H, while permitting it to oscillate thereon. The normal relative positions of the parts last described is shown by full lines at Figs. 23 and 24. When the foot pedals or either of them are pressed downward, as shown by dotted lines at Fig. 24, the tappet $m^2$ of the stirrup M will come in contact with the outer end $n^4$ of the arm N and carry the arm N around to the position shown by dotted lines at same figure, and thereby partly rotate the shaft H, or rock it in one direction to an extent limited by the pedal L coming in contact with the outer end $l^3$ of the bracket $l'$, to give a partial rotation to the seed-cup wheel, as hereinafter described. The foot pressure being then removed, the spring L' acting on the rock-shaft, as hereinafter described, will give a reverse movement thereto, and thereby to the arm N, and restore the foot pedals L and the stirrups M to their normal positions, shown by full lines at Fig. 24. When the stirrup M, link $l^2$ and foot pedal L are turned into the positions shown by dot lines at Fig. 23, these parts will sustain themselves in such positions, and permit of the rock-shaft H being oscillated by any automatic mechanism, to actuate the seed-cup wheels, without moving the foot pedals L. Each bevel pinion $h$, hereinbefore referred to, is fixed to one end of a sleeve P, which is loosely mounted on a shaft H, and has fixed to its other end a wheel R, having teeth $r$, whereby the pinion $h$ and wheel R on each sleeve P revolve simultaneously with each other. The sleeves P are located, as shown at Fig. 21, each with the toothed wheel R which it carries exterior to and preferably on the side of the seed-box toward the center of the planter. Adjacent to one side of each toothed wheel R a head S is bolted and fixed to the shaft H, preferably in same manner as the keeper N is fixed to same shaft, and from it projects an arm $s$, with one end of a pawl $s'$ pivotally connected with its outer end, in such manner that the lower end of said pawl hangs loosely over the wheel R, and is prevented from being thrown back out of its working position by a lug $s'$ that projects over it from the end of the arm S. Another arm projects from the arm S, and is bent laterally to form a trip $s^2$, which extends across the periphery of the wheel R. Another arm $s^3$ projects from the arm S, and has its outer end formed into a hook, with which the lower end of the spring L' is engaged, the upper end of said spring being fixed to the seed-box. The arms S, $s^3$, and trip $s^2$ are preferably integral and fixed as before stated to the rock-shaft, to move therewith, but they may be separate parts and be fixed separately to the rock-shaft, so that they have simultaneous movements with said shaft. A plate V bolted to the side of the seed-box has the outer ends of detents $v$, $v'$, pivoted thereto, which detents project toward each other, and are held by their own gravity in contact with the upper part of the wheel R, except when one of them is raised therefrom, as hereinafter described. The detents $v$, $v'$, are preferably located on the inner side of the plate V, and the pawl $s$ and arm S on the outer side of said plate, which thereby acts to prevent them interfering with each other, see Fig. 21. A bracket or guard $v^2$ is bolted to the plate V at its upper end, extends over and protects the parts between it and the seed-box, and has a bearing $v^3$ at its lower end, for the shaft H.

Assuming the parts shown at Figs. 18 and 19 to be in the normal positions there shown, and the foot-pedal and other parts to be in the normal positions shown at Fig. 24 by full lines, and the foot pedal or pedals to be oscillated downwardly by the operator or driver to the dot line position shown, and to thereby give a partial rotation to the rock-shaft, as hereinbefore described, such movement of the rock-shaft will, by means of the arm S, carry the pawl $s$ to the position shown at Fig. 20, and it being in contact with one of the cogs $r$, will force the wheel R, around to the position shown at the same figure and thereby impart to the sleeve P and pinions $h$ the same degree of angular movement as was given to the wheel R, and this partial rotation of the pinion $h$ will impart to the seed-cup wheel a partial revolution and bring one of its seed cups beneath the cut off, where it will register with the aperture $h^4$ in the seed-box bottom, and deliver its contained charge of seed therethrough to the seed-tube. When the wheel R is partially rotated as last described, the trip $s^2$ will be carried from beneath the detent, or detent pawl, $v'$, and permit said detent to drop with its end in advance of the tooth $r$ next succeeding the one last acted on by the pawl $s$, (see Fig. 20,) to arrest the further forward movement of the wheel R and seed-cup wheel, and at the same time the detent $v$ will fall from the cog $r$ which supported it, and with its point in rear of the same cog, and serve to restrain the wheel R, pinion $h$ and seed-cup wheel from any backward movements that might arise from the backward movement of the arms S, $s^3$, and trip $s^2$, from jarring or jolting of the planter, or from any other accidental cause. At Fig. 22, the last described full forward movements of the parts are shown as only partly executed, the detent $v$ still sustained on the cog in rear of which it falls, and the detant $v'$ yet sustained above the cogs $r$ by the trip $s^2$. After the full forward movements hereinbefore described, of the rock-shaft, arm S, wheel R, sleeve P, pinion $h$ and seed-cup wheel, the spring L' acts through the hook-arms $s^3$, on the shaft H, to rock it in a reverse direction to that last described, and thereby return the arm S and trip $s^2$ to the positions shown at Figs. 18 and 19, while the wheel R, sleeve P, pinion $h$ and seed-cup wheel remain stationary. The trip arm $s^2$ in making the return movement last described, comes in contact with the detent $v'$ and trips it, or raises it and holds it out of contact with the tooth $r$ with which it was last engaged, as shown at Figs. 18 and 19, and in position for permitting another partial rotation forwardly of the rock-shaft, arms S, $s^3$, trip arm $s^2$, sleeve P, pinion $h$, and seed-cup wheel, as and for the purposes hereinbefore described.

It will be seen from the foregoing that the oscillating movement of the rock-shaft H in one direction on its axis, will by means of the instrumentalities described impart a partial revolution to the seed-cup wheel, and that a reverse movement of the rock-shaft does not act upon the seed-cup wheel, and hence that the seed-cup wheel receives, through the instrumentalities described, an intermittent revolution, or is intermittingly revolved by oscillatory or rocking movements of the rock-shaft, for the purpose of bringing the seed-cups of its circular series in succession over the discharge opening $h^4$, at such times as the rock-shaft may be given an oscillatory movement in one direction, for that purpose, and as hereinbefore described.

The seed-tube, (see Fig. 12) has in addition to its ordinary seed-duct $c^{12}$, a chamber $c^{13}$ in front of and separated therefrom by a partition $c^{14}$, which terminates at its lower end a short distance above the lower end of the seed-tube. The discharging valve Y is located below the lower end of the partition $c^{14}$ and is there pivoted at $y$ to the side walls of the seed-tube. The valve Y has a straight arm $y'$ projecting tangentially from its center, and a curved arm $y^2$ also at a tangent to its center, and having at its outer end an arc shaped arm $y^3$ with a curve concentric with the axis of oscillation of the valve. The arms $y'$, $y^2$, and one end of the arm $y^3$ form the sides of a U-shaped pocket or seed-cup $y^4$. An arm $y^5$ projects from the valve Y, and is pivotally connected at its outer end with the lower end of a link or connecting rod Z, the upper end of which is pivotally connected with a crank-arm $z'$ which is fixed to the shaft H beneath the seed-box and within the chamber $c^{13}$, (see also Fig. 8.) The arms of the valve Y are of such width as to extend across the seed-tube. The normal position of the valve Y is as shown by full lines at Fig. 12, with the seed-cup $y^4$ in position to receive a charge of seed delivered to it by the seed-cup wheel, while the arms $y'$ and $y^2$ close the lower end of the seed-duct, as shown. When the rock-shaft H is given an oscillatory motion, as hereinbefore described, to impart a movement to the seed-cup wheel, and bring it into position for one of its seed-cups to deliver its contents to the seed-tube, the crank arm $z'$ will be turned into the position shown by full lines at Fig.

8, and dot lines at Fig. 12, and in swinging into such position will, by means of the rod Z turn or swing the valve Y into the position shown by dot lines at Fig. 12, thereby discharging the seed it contained in the cup $y^4$ from a previous movement of the seed-cup wheel, and receiving and retaining on the convex side of the arm or plate $y^3$ the seed delivered by the seed-cup wheel at its movement made simultaneously with the movement last described of the valve Y. The curved arm or plate $y^3$ closes the opening at the lower end of the seed-duct $c^{12}$ so quickly after the plate or arm $y'$ is turned or swung to open it, that no dribbling of seed to the furrow can take place, and when the foot pedal is released and the spring L' turns the rock shaft in the reverse direction, the valve Y will be swung backwardly to the position shown by full lines, and in so swinging the arm or plate $y^3$ will have the seed contained thereon scraped backwardly therefrom to drop into the seed-cup $y^4$, ready for discharge by another movement of the foot pedal, rock-shaft, and valve Y, such as hereinbefore described.

The cap-plate $G^3$ is of ordinary construction, having an annular opening $z^2$ which is coincident with the circular series of seed-cups $g$, and ordinary bridge bars $z^3$. The cut-off $z^4$ has pendent sides $z^5$, a larger central opening $z^6$ with a slot $z^7$ at each side thereof. A U-shaped spring $z^8$ has its central or bent part resting beneath a plate $z^9$ which is bolted to the central part of the cap $G^3$, and its ends seated in the opening $z^6$. Pins $z^{10}$ fixed in the walls of opening $z^2$ pass, one through each slot $z^7$, and permit either end or side or both sides of the cut-off to rise and fall as may be necessary, and at the same time hold the cut-off from lateral displacement. The ends of the spring $z^8$ resting in the opening $z^6$ will hold the cut-off down upon the seed-cups with a yielding pressure, permitting either or both its ends to rise and fall as may be required.

The wheels $a'$ and runners $c^4$ are arranged in such relation to each other that a wheel runs closely to the path of each runner, and preferably closely in rear of the runner. The operation of the single, inclined wheel, when so arranged with reference to a runner, is shown at Figs. 26 and 28. The wheel will force the soil over to thoroughly cover the deposits of seed, and will compress and slightly but sufficiently compact the soil toward one side of and against the seed, while leaving it in loose condition immediately over the seed, and in a ridge with a groove or furrow at one side thereof, which is deeper than when made with a double wheel with inclined rims, and is more effective.

Combinations hereinbefore described, and shown in the drawings herewith, are made the subject matter of claims in an application for Letters-Patent for improvements in check-rower corn-planters, executed of even date herewith and filed February 10, 1892, Serial No. 420,960, and hence are not claimed herein.

What I claim as new, and desire to secure by Letters Patent herein, is—

1. In combination, in a corn planter, substantially as hereinbefore described, a rear frame substantially triangular in form, supported on wheels at its rear end, and at its convergent forward end on a caster wheel; and a forward frame also of substantially triangular form, consisting of side frame bars connected at their rear ends by a transverse bar, and having the seed tubes, runners and seed boxes mounted thereon to rise and fall therewith, said forward frame hinged at its convergent forward end to the convergent forward end of the rear frame, whereby its rear end may be raised and lowered on the rear frame supported on the forward caster wheel and the rear supporting and covering wheels.

2. In combination in a corn-planter, substantially as hereinbefore described, a rear frame of substantially triangular form, supported on wheels at its rear end, and a front frame also of substantially triangular form, consisting of side frame bars diverging rearwardly from close proximity at their forward ends, connected at their rear ends by a transverse bar, and having seed-tubes, runners and seed-boxes mounted thereon, said front frame pivoted or hinged at its forward end to the forward end of the rear frame, and a lever fixed to a rock-shaft which extends across and is journaled on the rear frame, and carries a crank-shaft at each end, one of which crank shafts is connected by a link rod with each side of the rear part of the front frame, for raising and lowering it.

3. In combination in a corn-planter, substantially as hereinbefore described, a rear frame supported at its rear end on wheels, and having side frame bars converging at their forward ends, a head or block to which said frame bars are fixed at their forward ends, a forward frame having side frame bars pivotally connected with said head, and a caster wheel having its stock journaled in said head, to support the forward ends of the forward and rear frames.

4. In combination in a corn-planter, substantially as hereinbefore described, a rear frame supported at its rear end on wheels, and having side frame bars converging at their forward ends, a head or block to which said frame bars are fixed at their forward ends, a forward frame having side frame bars pivotally connected with said head, a caster wheel having its stock journaled in said head, a tongue pivotally connected with the same head, to swing in a vertical plane, and a slotted guard for the rear end of the tongue, to prevent lateral deflection thereof.

5. In combination, in a corn-planter, substantially as hereinbefore described, a rear frame of substantially triangular form supported on wheels at its rear end and on a caster wheel at its forward end, a front frame also substantially triangular in form, and pivoted at its forward end to the forward end of the rear frame, and lugs $c^{19}$ fixed to the side frame bars of the forward frame, and adapted to coact with grooved blocks $c^{10}$ which are fixed to the rear frame to prevent lateral movement of the forward frame with reference thereto.

6. In combination, in a corn-planter, substantially as hereinbefore described, a rear frame of substantially triangular form, supported on wheels at its rear end and on a caster wheel at its forward end, a front frame also substantially triangular in form and pivoted at its forward end to the forward end of the rear frame, lugs $c^{19}$, grooved blocks $c^{10}$, and a lock lever journaled on the rear frame and connected with the rear end of the front frame to raise and lower and lock it in different positions, substantially as described.

7. In combination in a corn-planter, substantially as hereinbefore described, a rear frame A and front frame A' constructed substantially as described, and hinged to each other at their forward ends, lugs $c^{19}$, grooved blocks $c^{10}$, and a lever fixed to a rock-bar extending across and journaled to the rear frame, and having crank arms, one of which is connected with each seed-tube of the forward frame.

8. In combination, in a corn-planter, substantially as hereinbefore described, a rock shaft, a stirrup loosely mounted thereon, and having a tappet bar $m'$, a block fixed to the rock-shaft and having an arm N, a foot pedal, hinged to the frame of the planter, and connected by means of a link rod with said stirrup, whereby the pedal lever can be forced downwardly to give an oscillation to the rock-shaft in one direction, for operating the seeding mechanism in planting, and ordinary means for giving the rock shaft a reverse motion, and restoring the foot pedal to its normal position.

9. In a corn-planter, in combination, substantially as hereinbefore described, a rock-shaft H adapted to operate the seeding mechanism, a stirrup M loosely mounted on said rock-shaft and having a tappet bar $m^2$, an arm N fixed to the rock-shaft, a foot pedal L hinged to the frame of the planter, a link rod $l^2$ connecting the foot pedal and stirrup, and a stop $l^3$ to limit the downward swing of the foot pedal.

10. In a corn-planter, in combination substantially as hereinbefore described, a rear frame supported on inclined wheels at its rear end, one inclined wheel at each side of said frame, and supported on a caster wheel at its forward end, and a forward frame hinged at its forward end to the forward end of the rear frame, and provided with seed-boxes, seed-tubes and runners, one of which runners is slightly in advance of and to one side of each single, inclined wheel, substantially as shown and described.

11. In a corn-planter, in combination substantially as hereinbefore described, a rear frame supported on inclined wheels at its rear end, one inclined wheel at each side of said frame, and supported on a caster wheel at its forward end, a forward frame hinged at its forward end to the forward end of the rear frame, and provided with seed-boxes, seed tubes and runners, one of which runners is slightly in advance of and to one side of each single, inclined wheel, substantially as shown and described, a rock-shaft, a stirrup loosely mounted thereon and having a tappet bar $m'$, a block fixed to the rock-shaft and having an arm N, a foot pedal hinged to the frame of the planter and connected by means of a link rod with said stirrup, whereby the pedal lever can be forced downwardly to give an oscillation to the rock-shaft in one direction, for operating the seeding mechanism in planting, and ordinary means for giving the rock-shaft a reverse motion.

12. In a corn-planter, in combination, substantially as described, a seed-cup plate, a cap-plate, a cut-off having slots $z^7$ and opening $z^6$, a ∪-shaped spring $z$ fixed to the cap-plate and its ends seated in the opening $z^6$, and pins $z^{10}$ fixed to the cap-plate and seated in the slot $z^7$, substantially as described.

13. A corn-planter seed-cup wheel, embodying in its construction, and in combination substantially as hereinbefore described, a central part having longer and larger cogs, $g^5$, alternating with shorter and smaller cogs $g^6$, and an annular part having seed-cups, and a flange $g^2$ with spaces $g^4$ whereby said parts can be properly aligned with each other and connected.

14. In a corn-planter, in combination, substantially as hereinbefore described, a seed-cup wheel having a bevel gear on its under side, with larger cogs $g^5$ and smaller cogs $g^6$, and a bevel pinion $h$ for rotating it, having cogs in pairs, with larger interdental spaces for the cogs $g^5$, and smaller interdental spaces for the cogs $g^6$, whereby the seed-cup wheel can be properly located for delivering seed to the discharge opening in the seed-cup bottom.

15. In a corn planter, in combination, substantially as described, a seed-box bottom with a circular opening $g^{10}$, and a seed cup wheel having a bevel gear on its under side, with elongated cogs $g^5$ adapted to rest on the wall of said opening, for the purpose specified.

In testimony whereof I affix my signature in presence of two witnesses.

ABRAHAM ANDERSON.

Witnesses:
O. J. COLTON,
E. A. BANCROFT.